United States Patent
Ozdemir et al.

(10) Patent No.: US 7,426,439 B2
(45) Date of Patent: Sep. 16, 2008

(54) METHOD AND APPARATUS FOR MARINE SEISMIC DATA ACQUISITION

(75) Inventors: Ahmet Kemal Ozdemir, Ankara (TR); Oeyvind Teigen, Notodden (NO); Lars Borgen, Oslo (NO); Vidar A. Husom, Asker (NO)

(73) Assignee: WesternGeco L.L.C., Houston, TX (US)

( * ) Notice: Subject to any disclaimer, the term of this patent is extended or adjusted under 35 U.S.C. 154(b) by 58 days.

(21) Appl. No.: 11/432,255

(22) Filed: May 11, 2006

(65) Prior Publication Data
US 2007/0265786 A1    Nov. 15, 2007

(51) Int. Cl.
G06F 19/00 (2006.01)
G06F 17/40 (2006.01)
G01V 1/28 (2006.01)
G01V 1/24 (2006.01)
G01V 1/00 (2006.01)

(52) U.S. Cl. .............. 702/17; 73/570; 73/584; 73/587; 175/1; 181/101; 181/108; 181/110; 181/112; 367/15; 367/20; 367/21; 367/153; 367/154; 702/1; 702/2; 702/6; 702/14; 702/189; 702/190

(58) Field of Classification Search ............ 73/570, 73/584, 587, 594; 175/1; 181/101, 108, 181/110, 112, 121; 367/15, 16, 20, 21, 140, 367/144, 153, 154; 702/1, 2, 6, 11, 14, 17, 702/189, 190, 195
See application file for complete search history.

(56) References Cited

U.S. PATENT DOCUMENTS

| | | | | |
|---|---|---|---|---|
| 2,607,842 A | * | 8/1952 | Reid | 367/16 |
| 2,614,165 A | * | 10/1952 | Doolittle | 367/16 |
| 2,638,176 A | * | 5/1953 | Doolittle | 367/16 |
| 2,757,356 A | * | 7/1956 | Haggerty | 367/24 |
| 2,923,916 A | * | 2/1960 | Woodworth | 367/155 |
| 3,189,870 A | * | 6/1965 | Roever | 367/20 |
| 3,335,401 A | * | 8/1967 | Kerns | 367/22 |
| 3,489,996 A | * | 1/1970 | Moon et al. | 367/23 |
| 4,281,402 A | | 7/1981 | Kruka et al. | |
| 4,694,436 A | | 9/1987 | Gelfand | |
| 4,821,241 A | | 4/1989 | Berglund | |

(Continued)

FOREIGN PATENT DOCUMENTS

GB    2 337 592    5/2000

OTHER PUBLICATIONS

"Definition: coherence length" down loaded on Jul. 11, 2008 from www.its.bldrdoc.gov/fs-1037/dir-008/_1055.htm.*

(Continued)

Primary Examiner—Edward R Cosimano
(74) Attorney, Agent, or Firm—Jeffrey A. Pyle; Liangang (Mark) Ye; Jeffrey E. Griffin

(57) ABSTRACT

The present invention provides a method and apparatus for seismic data acquisition. One embodiment of the method includes accessing data acquired by at least two particle motion sensors. The data includes a seismic signal and a noise signal and the at least two particle motion sensors being separated by a length determined based on a noise coherence length. The method may also include processing the accessed data to remove a portion of the noise signal.

34 Claims, 10 Drawing Sheets

U.S. PATENT DOCUMENTS

| | | | |
|---|---|---|---|
| 5,351,218 | A | 9/1994 | Hatteland et al. |
| 6,408,978 | B1* | 6/2002 | Premus .................... 181/120 |
| 6,684,160 | B1* | 1/2004 | Ozbek et al. ................ 702/17 |
| 6,751,559 | B2* | 6/2004 | Fookes et al. ............... 702/17 |
| 7,282,698 | B2* | 10/2007 | Childers ............... 250/227.14 |
| 2004/0049347 | A1* | 3/2004 | Fookes et al. ............... 702/14 |
| 2007/0051882 | A1* | 3/2007 | Childers ............... 250/227.14 |

OTHER PUBLICATIONS

Carey: "The Determination of Signal Coherence Length Based of Signal Coherence and Gain Measurements in Deep and Shallow Water", Oceans '97 MTS/IEEE Conference Proceedings, Oct. 6-9, 1997, vol. 1, pp. 462-470.*

Butzer, Schmeisser and Stens, "An introduction to sampling analysis," *Nonuniform Sampling: Theory and Practice*, Marvasti, Ed., Kluwer Academic / Plenum Publishers, pp. 17-121, 2001.

Duijndam, Schonewille and Hindriks, "Irregular and sparse sampling in exploration seismology," *Nonuniform Sampling: Theory and Practice*, Marvasti, Ed., Kluwer Academic / Plenum Publishers, pp. 479-518, 2001.

Meirovitch, *Analytical methods in vibrations*, Collier-MacMillan Ltd., New York, pp. 332, 353, 442, 1967.

* cited by examiner

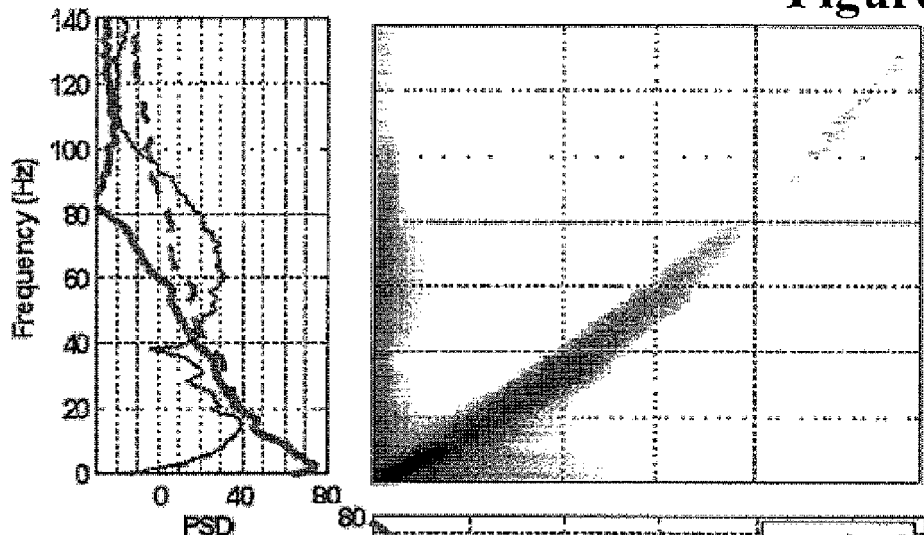
Figure 9(b)
Figure 9(a)
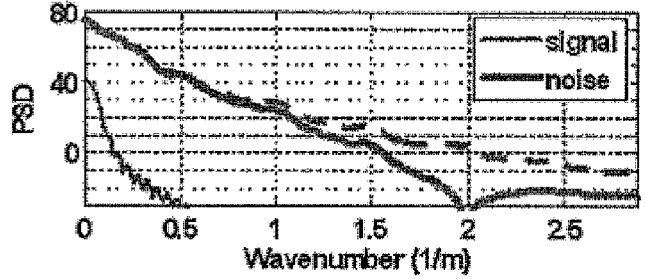
Figure 9(c)
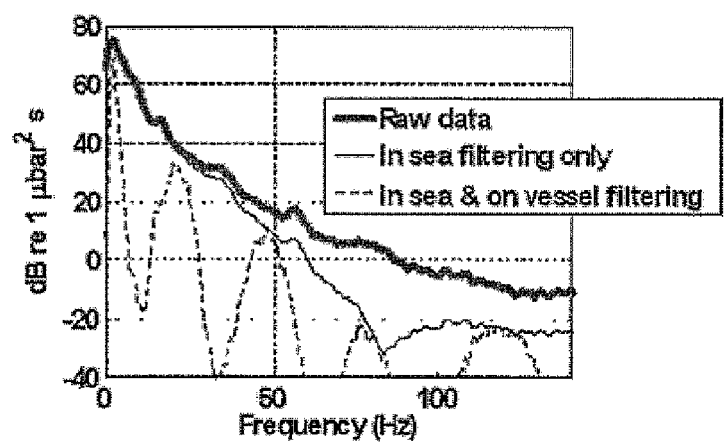
Figure 9(d)

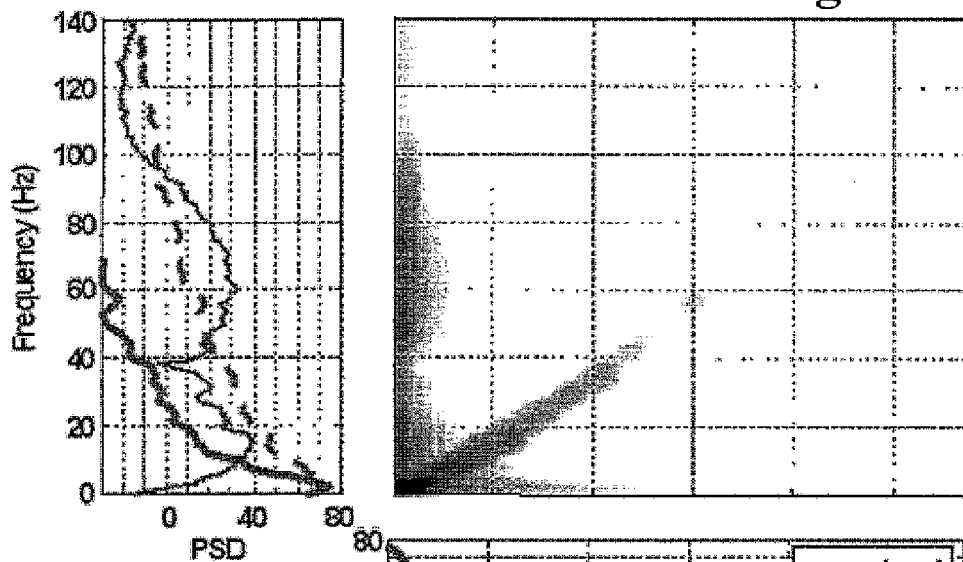
Figure 10(b)
Figure 10(a)
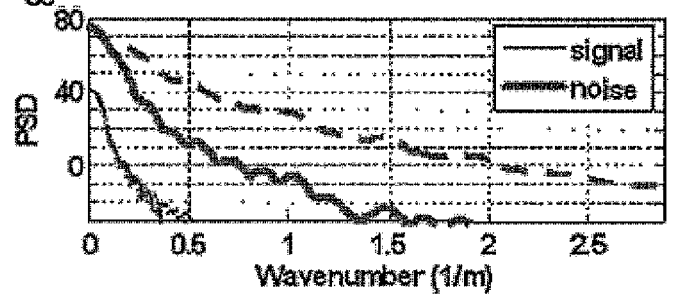
Figure 10(c)
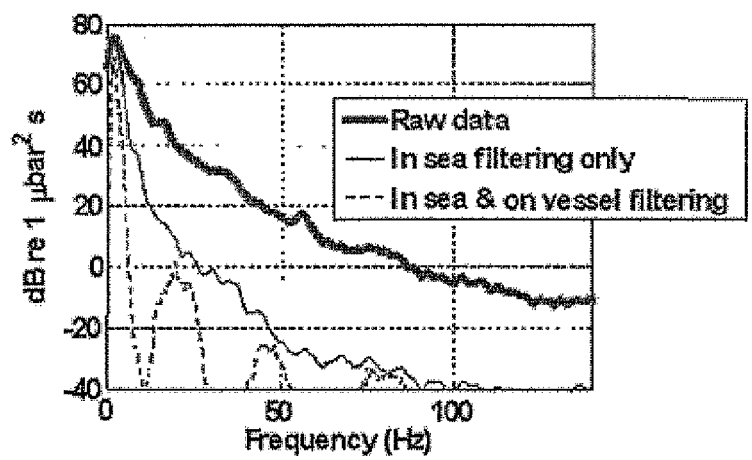
Figure 10(d)

METHOD AND APPARATUS FOR MARINE SEISMIC DATA ACQUISITION

BACKGROUND OF THE INVENTION

This invention relates generally to marine seismic systems, and, more particularly, to marine seismic data acquisition using particle motion sensors for seismic wavefield characterization.

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey 100 conceptually illustrated in FIG. 1, one or more marine seismic streamers 105 are towed behind a survey vessel 110. The seismic streamers 105 may be several thousand meters long and contain a large number of sensors 115, such as hydrophones and associated electronic equipment, which are distributed along the length of the each seismic streamer cable 105. The survey vessel 110 also includes one or more seismic sources 120, such as airguns and the like.

As the streamers 105 are towed behind the survey vessel 110, acoustic signals 125, commonly referred to as "shots," produced by the seismic source 120 are directed down through the water column 130 into strata 135, 140 beneath a water bottom surface 145, where they are reflected from the various subterranean geological formations 150. Reflected signals 155 are received by the sensors 115 in the seismic streamer cables 105, digitized, and then transmitted to the survey vessel 110. The digitized signals are referred to as "traces" and are recorded and at least partially processed by a signal processing unit 160 deployed on the survey vessel 110. The ultimate aim of this process is to build up a representation of the subterranean geological formations 150 beneath the streamers 105. Analysis of the representation may indicate probable locations of hydrocarbon deposits in the subterranean geological formations 150.

Processing of continuous domain signals such as the reflected signals 155 by sampled data systems is a well-known technique. The theoretical groundwork for these techniques is laid by the Whittaker-Kotel'nikov-Shannon sampling theorem which states that any signal $f(x)$ can be reconstructed from its uniformly spaced samples if the sampling interval is less than half the period of the highest spectral component in that signal. The maximum frequency component a sampled data system can accurately handle is called as its Nyquist limit. Thus, if $f(x)$ is band-limited to the wavenumber $\sigma/2$, which is known as the Nyquist number, then the sampling theorem provides the following formula to interpolate any function value from uniformly spaced values $f(m/\sigma)$:

$$f(x) = \sum_{-\infty}^{\infty} f(m/\sigma) \frac{\sin\pi(\sigma x - m)}{\pi(\sigma x - m)}$$

Thus, the sampling theorem provides a way to reconstruct the signal "exactly" from its uniformly spaced samples when the sampling rate is sufficient.

For marine applications, the spatial sampling interval for seismic signals, e.g. the spacing between the seismic sensors 115, is commonly chosen as a multiple of 3.125 m. By using such a sampling interval, any seismic signal with a wavelength longer than the seismic sensor spacing can be accurately handled. However, spectral components greater than the Nyquist number may "alias" (i.e., shift) into the spectral band of interest. Thus, seismic waves that have wavelengths smaller than the seismic sensor spacing may be under sampled and aliased. Aliasing is an undesirable side effect because aliasing is not typically an invertible transformation of the data and so may be difficult to remove from the data. A sensor spacing of 3.125 m is typically adequate to sample the reflected signals 155 provided by the seismic sources 115 because the acoustic speed of sound in water is about 1500 m/s. Consequently, a sensor spacing of about 3.125 m may provide unaliased data up to frequencies of about 250 Hz.

Seismic sensors 115 such as particle motion sensors may sense vibration noise that may be present in the seismic cable 105. Therefore, particle motion sensors, such as accelerometers, geophones, and pressure gradient sensors, are very sensitive to vibration noise. In contrast, hydrophones may average out the vibration noise present in the table. Vibration noise is highly non-stationary, has very small coherence lengths, and may be present at almost all frequencies. Consequently, the vibration noise may not appear coherent when sensed with seismic sensors 115 that are conventionally spaced (e.g., with a spacing of about 3-25 m). The seismic sensors 115 may also sense other types of noise, such as bulge waves and swell noise. However, these types of noise typically have much longer coherence lengths than the vibration noise. Bulge waves and swell noise also typically propagate with velocities that are much lower than the acoustic velocity in water.

FIGS. 2(*a*), 2(*b*), and 2(*c*) illustrate a spectral characterization of a seismic signal and vibration noise in the continuous (i.e., unsampled) domain. FIG. 2(*a*) (shown at the top right) is a frequency-wavenumber (FK) plot that indicates the energy of the signal and noise as a function of both wavenumber and frequency. FIG. 2(*a*) is color encoded such that the lighter shades of grey denote the low energy regions and darker shades of grey denote the high energy regions. The slope of the center of mass of the noise energy in FK plot shown in FIG. 2(*a*) gives the dominant velocity of the vibration noise. Thus, the vibration noise has a frequency dependent (equivalently wave number dependent) velocity. The FK plot shows that, consistent with theory, the speed of the vibration noise increases with frequency and wave number.

The projections of the FK plot shown in FIG. 2(*a*) on to the horizontal axis (FIG. 2(*b*)) and vertical axis (FIG. 2(*c*)) show the power spectral distribution (PSD) of the signal and noise as a function of wavenumber and frequency, respectively. FIGS. 2(*b*) and 2(*c*) show that the noise is comparable to or stronger than the signal over the illustrated range of frequencies and wavenumbers and that the noise and the signal are present at all frequencies up to 100 Hz. Since the vibration noise and seismic signal occupy the same frequency band, it is not possible to separate them by using time-domain processing only. Also, the seismic signal would likely be masked because the vibration noise is relatively strong compared to the seismic signal. FIGS. 2(*b*) and 2(*c*) also show that the signal (solid line) is limited to low wave numbers (about 0.1 l/m) but the vibration noise (dashed line) may extend to wavenumbers of about 2.5 l/m (i.e., to wavelengths below 40 cm). Hence, the seismic signal and the vibration noise have widely different wavelengths over a range of about 10 Hz. Consequently, severe aliasing may result if a conventional spacing of the seismic sensors 115 is used for digitization of the continuous space signal and it may not be possible to discriminate the signal from the vibration noise.

FIG. 3 illustrates one embodiment in which the seismic signal may be difficult to separate from vibration noise. In the illustrated embodiment, a spatial sampling interval of 3.125 m was used to sample the seismic data. Since the vibration noise in this example has a velocity of about 30 m/s, it aliases at frequencies as low as about 4.8 Hz. So, there are many overlaps of vibration noise and the seismic signal throughout the frequency band of interest. When the spectrum of the vibration noise overlaps with that of signal, it is no longer possible to separate that part of the signal spectrum from noise. Hence the aliasing is very severe.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for seismic data acquisition. One embodiment of the method includes accessing data acquired by at least two seismic sensors. The data includes a seismic signal and a noise signal and the at least two seismic sensors being separated by a length determined based on a noise coherence length. The method may also include processing the accessed data to remove a portion of the noise signal.

In another embodiment of the present invention, an apparatus is provided for seismic data acquisition. The apparatus may include at least two seismic sensors separated by a length determined based on a noise coherence length and configured to receive data including a seismic signal and a noise signal. The apparatus may also include a processing unit communicatively coupled to the at least two seismic sensors. The processing unit may be configured to access data acquired by the at least two seismic sensors and process the accessed data to remove a portion of the noise signal.

In another embodiment of the present invention, a method is provided for seismic data acquisition. One embodiment of the method includes accessing data acquired by at least two seismic sensors. The data includes a seismic signal and a noise signal. The method may also include processing the accessed data in-sea to remove a portion of the noise signal.

In another embodiment of the present invention, an apparatus is provided for seismic data acquisition. The apparatus may include at least two seismic sensors configured to receive data including a seismic signal and a noise signal. The apparatus may also include a processing unit communicatively coupled to the at least two seismic sensors. The processing unit may be configured to access data acquired by the at least two seismic sensors and process the accessed data in-sea to remove a portion of the noise signal.

BRIEF DESCRIPTION OF THE DRAWINGS

The invention may be understood by reference to the following description taken in conjunction with the accompanying drawings, in which like reference numerals identify like elements, and in which:

FIGS. 9(a), 9(b), 9(c), and 9(d) illustrate noise attenuation for a first exemplary embodiment of in-sea processing, in accordance with the present invention; and FIGS. 10(a), 10(b), 10(c), and 10(d) illustrate noise attenuation for a second exemplary embodiment of in-sea processing, in accordance with the present invention.

Figure 1:
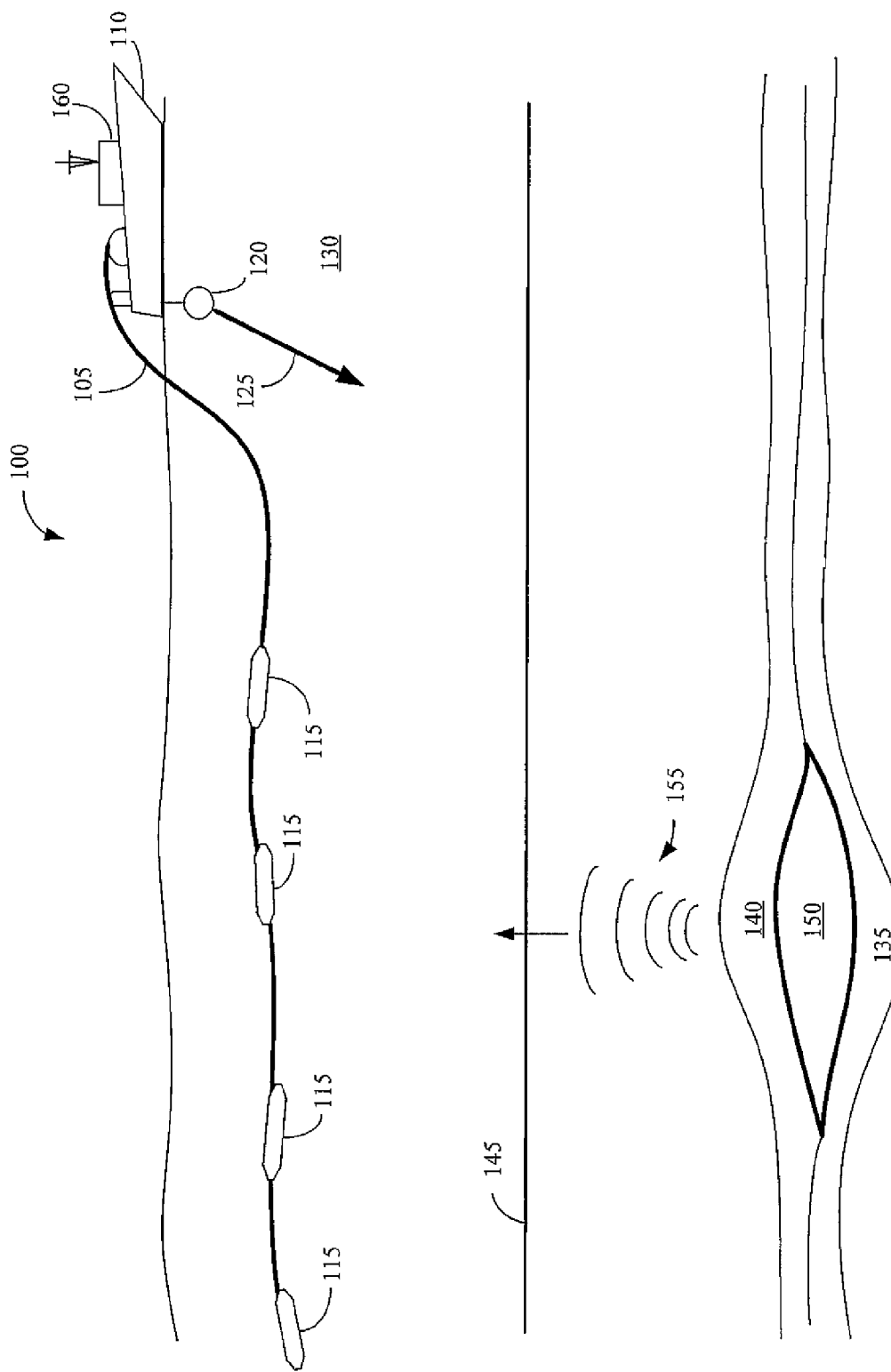
FIG. 1 conceptually illustrates a conventional marine seismic survey system.
Figure 2A:
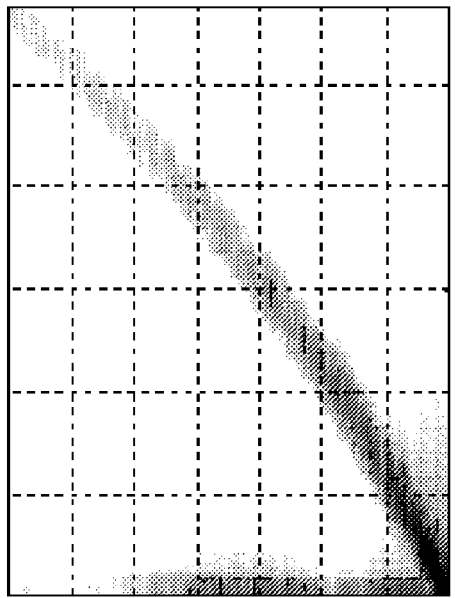
FIGS. 2(a), 2(b), and 2(c) illustrate a spectral characterization of a seismic signal and vibration noise in the continuous domain.
Figure 2B:
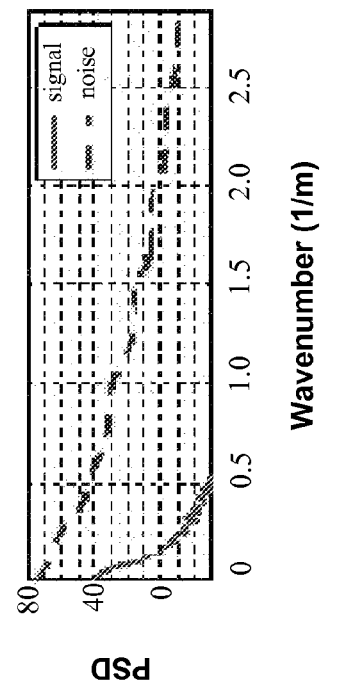
Figure 2C:
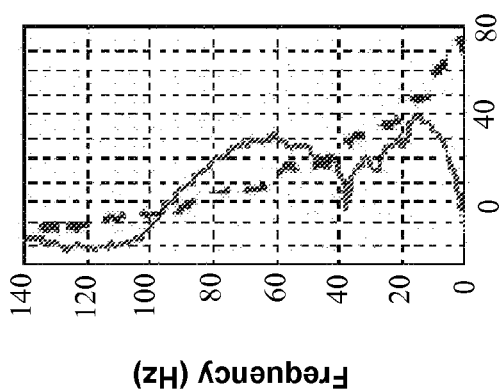
Figure 3:
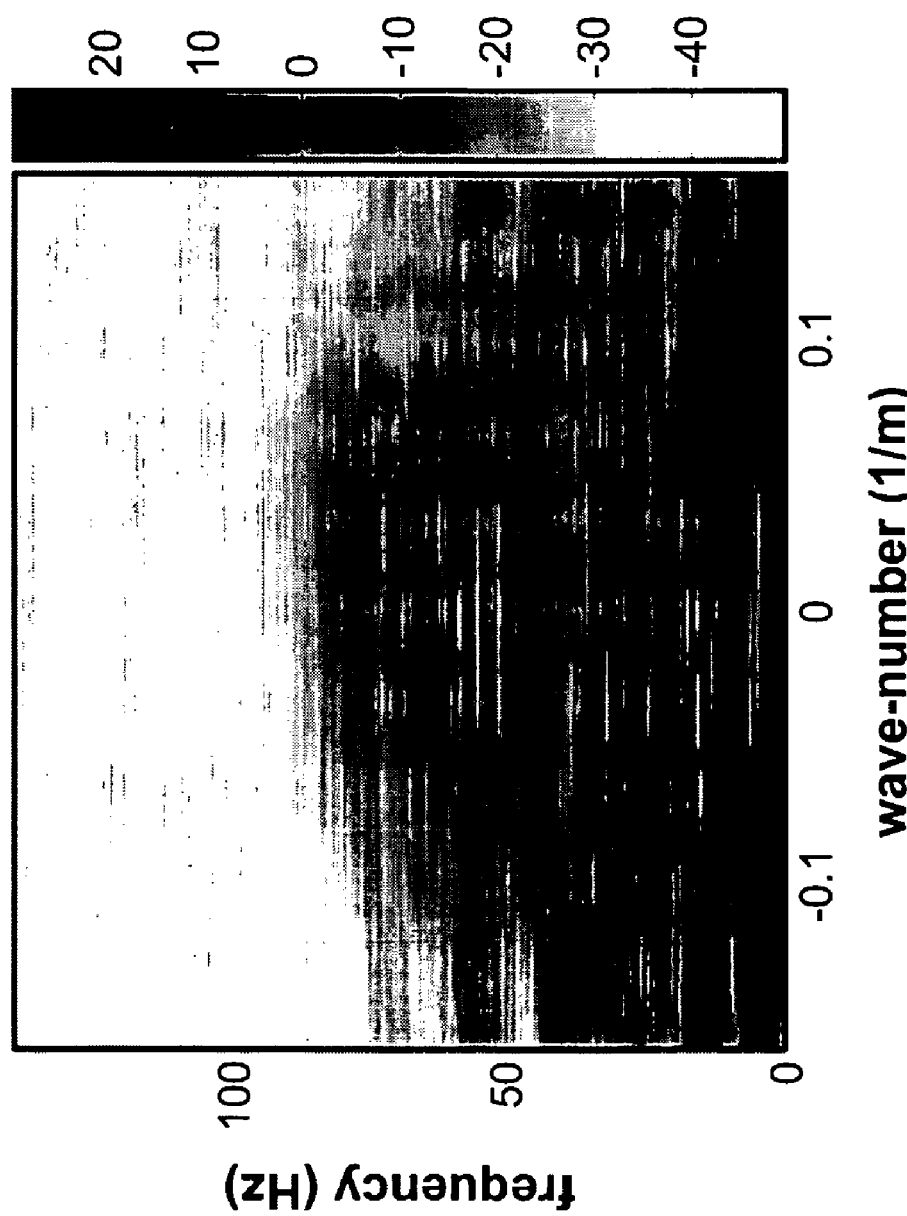
FIG. 3 illustrates one embodiment in which the seismic signal may be difficult to separate from vibration noise.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 4:
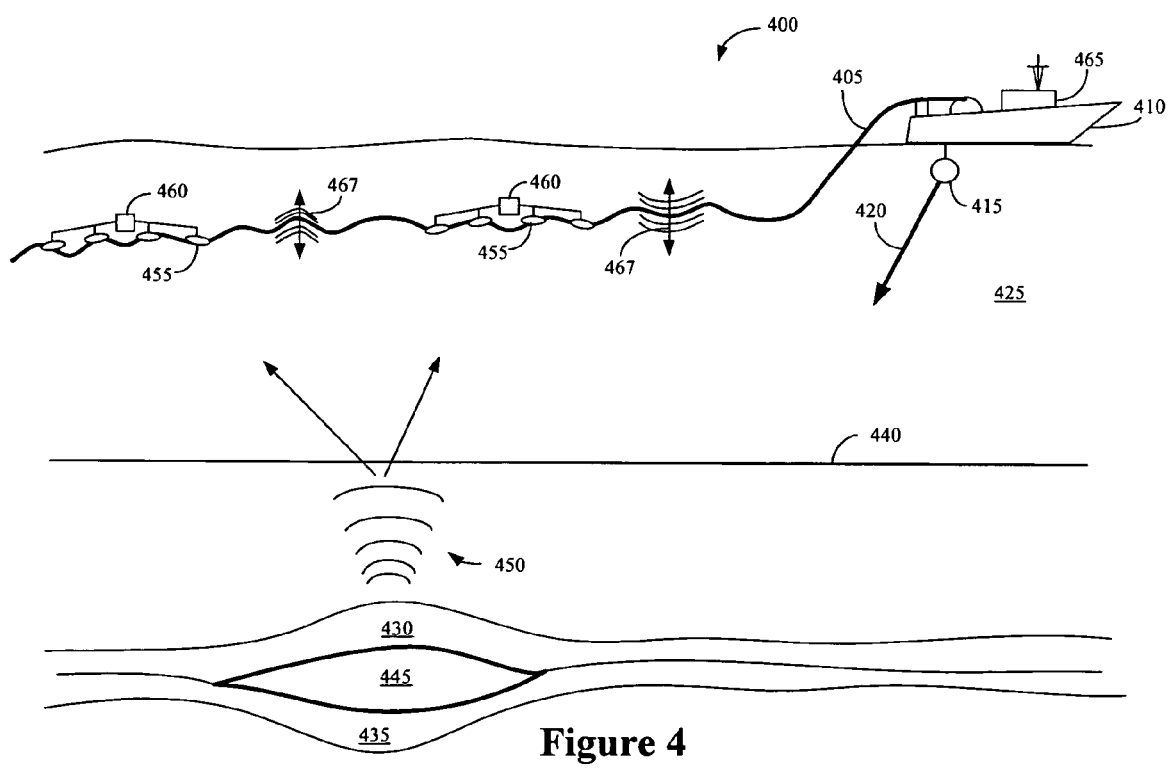
FIG. 4 conceptually illustrates one exemplary embodiment of a marine seismic survey system, in accordance with the present invention.

FIG. 4 conceptually illustrates one exemplary embodiment of a marine seismic survey system 400. In the illustrated embodiment, one or more marine seismic streamers 405 are towed behind a survey vessel 410. Although a single marine seismic streamer 405 is shown in FIG. 4, persons of ordinary skill in the art having benefit of the present disclosure should appreciate that the present invention is not limited to a single marine seismic streamer 405. In alternative embodiments, a plurality of marine seismic streamers 405 may be towed behind the survey vessel 410. For example, the survey vessel 410 may tow an array of marine seismic streamers 405. The survey vessel 410 may also be associated with one or more seismic sources 415, such as airguns and the like. In the illustrated embodiment, the seismic source 415 is coupled to the survey vessel 410. However, the present invention is not limited to seismic sources 415 that were coupled to the survey vessel 410. In alternative embodiments, the seismic sources 415 may be deployed at any location, such as beneath the survey vessel 410, attached to one or more buoys or floats (not shown), or at another independent source vessel (not shown).

In operation, the streamers 405 are towed behind the survey vessel 410 and acoustic signals 420, commonly referred to as "shots," produced by the seismic source 415 are directed down through the water column 425 into strata 430, 435 beneath a water bottom surface 440, where they are reflected from the various subterranean geological formations 445 to form reflected signals 450. Portions of the reflected signals 450 may be detected or sensed by one or more seismic sensors 455 (not all indicated in FIG. 4) that are deployed along the seismic cable 405. Exemplary seismic sensors 455 include, but are not limited to, seismic sensors 455 configured to measure vector wavefields, such as particle motion sensors, accelerometers, geophones, pressure gradient sensors, and the like.

In the illustrated embodiment, pluralities of the seismic sensors 455 are communicatively coupled to one or more processing units 460. FIG. 4 depicts the seismic sensors 455, the processing units 460, and the interconnections between these elements as being deployed along and external to the seismic cable 405 for ease of illustration. However, persons of ordinary skill in the art having benefit of the present disclosure should appreciate that the seismic sensors 455, the processing units 460, and the interconnections between these elements may not be deployed external to the seismic cable 405. For example, one or more of these elements may be deployed within a sheath that is a part of the seismic cable 405.

The processing units 460 may process data provided by the associated seismic sensors 455 in-sea before providing the partially processed data to an on-board processing unit 465. As used herein, the term "in-sea" will be understood to refer to operations that are performed while the marine seismic cable 405 is deployed from the survey vessel 410 and the processing unit 460 carrying out the operations is submerged in, or at the surface of, the water. For example, the processing units 460 that process portions of the data provided by the seismic sensors 455 in-sea may be processing the data while the seismic survey is being conducted. Processing a portion of the data in-sea may reduce the volume of data that is transmitted along the seismic cable 405. For example, if four seismic sensors 455 are coupled to each processing unit 460, the volume of data that is transmitted along the seismic cable 405 may be reduced by a factor of approximately four, relative to the volume of data that would be transmitted along the seismic cable 405 by the four seismic sensors 455 operating independently.

The seismic sensors 455 may detect various noise signals in addition to the seismic signals associated with portions of the reflected signal 450. The noise signals may include swell noise, bulge waves, and the like. In the illustrated embodiment, the noise signals may also include vibration noise 467 that may be transmitted along the seismic cable 405. For example, vibration noise 467 may be produced by the survey vessel 410 and/or equipment deployed on the survey vessel 410. Noise, such as the vibration noise, may be coherent over certain length scales. For example, experimentation has determined that the vibration noise 467 may be coherent over length scales less than approximately 1 meter, as will be discussed in more detail below. Accordingly, the phrase "coherence length of the vibration noise" will be understood herein to refer to the smallest wavelength present in the vibration noise that has a significant, non-zero amplitude.

Some of the seismic sensors 455 may be spaced at separations that correspond approximately to the expected noise coherence length. In one embodiment, the spacing of two or more of the seismic sensors 455 may be less than or approximately equal to half the noise coherence length. However, persons of ordinary skill in the art having benefit of the present disclosure should appreciate that the sensor separation could be chosen to be approximately equal to (or even a bit longer than) the noise coherence length. For example, two or more of the seismic sensors 455 may be deployed on the seismic cable 405 so that they are separated by approximately 1 meter or less, which may correspond to the expected coherence length of the vibration noise 467. For example, the seismic sensors 455 may be separated by a length in the range from about 30 cm to about 40 cm. In some embodiments, the coherence length of the noise may be determined using a velocity of the noise. For example, the seismic sensors 455 may be separated by a length corresponding to a velocity of the vibration noise that is within the range of 20 meters per second to 75 meters per second.

Spacing the seismic sensors 455 based on the expected noise coherence length may increase the total number of seismic sensors 455 deployed on the seismic cable 405 relative to conventional practice. Accordingly, seismic data collected by portions of the densely spaced seismic sensors 455 may be provided to the processing units 460, which may process the data in-sea, as discussed above. The partially processed data may be decimated to a longer group spacing in some embodiments. The processing units 460 may implement a variety of in-sea processing techniques including, but not limited to, analog group forming or averaging, digital group forming, temporal filtering, spatial filtering, spatio-temporal filtering, adaptive filtering based on a physical model of the noise, and the like.

Figure 5:
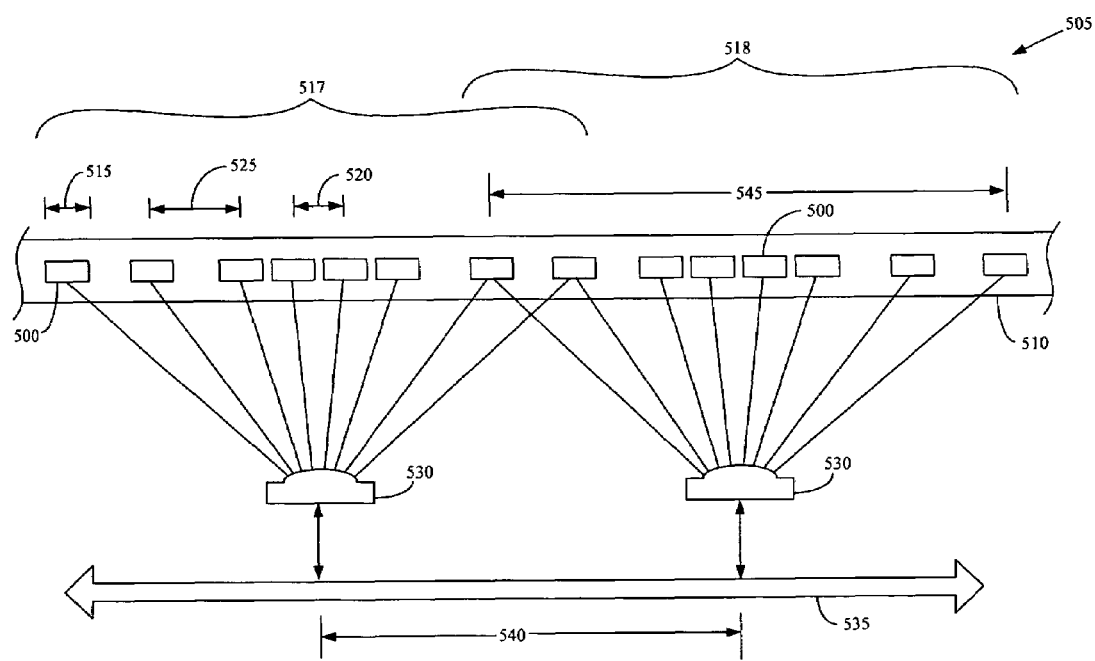
FIG. 5 conceptually illustrates one exemplary embodiment of seismic sensors in a marine seismic survey system, in accordance with the present invention.

FIG. 5 conceptually illustrates one exemplary embodiment of seismic sensors 500 in a marine seismic survey system 505. In the illustrated embodiment, the seismic sensors 500 are particle motion detectors deployed within a seismic cable 510. The seismic sensors 500 may therefore be capable of measuring particle motion in one or more dimensions. For example, the seismic sensors 500 may be multi-component particle motion sensors 500 that are able to detect particle motions in three dimensions. Exemplary seismic sensors 500 include, but are not limited to, accelerometers, geophones, pressure gradient sensors, and the like.

The seismic sensors 500 have a seismic sensor length 515, which may be the same for all of the seismic sensors 500 or may vary for different seismic sensors 500. For example, the seismic sensor length 515 may vary from a few millimeters for a point measurement to a few meters when mechanical averaging is used. The seismic sensor length 515 may also be increased by mounting the seismic sensor 500 within a body (not shown) that may be deployed within the seismic cable 510. The stiffness of the body should be relatively large, such that its natural frequency is above the seismic band of interest. For example, a typical material for the body may have a bulk stiffness greater than about 1.0 GPa and the length of the body may be up to about 60 cm. Noise may be averaged over the length of such a "rigid" sensor. Persons of ordinary skill in the art having benefit of the present disclosure should appreciate that the total number of seismic sensors 500, as well as the type of seismic sensors 500, is a matter of design choice and not material to the present invention.

The seismic sensors 500 may be grouped into one or more groups 517, 518. In various alternative embodiments, the seismic sensors 500 may each be assigned to a separate group 517, 518 or some of the seismic sensors 500 may be assigned to more than one of the groups 517, 518. Persons of ordinary skill in the art having benefit of the present disclosure should appreciate that the number of seismic sensors 500 in the groups 517, 518 are matters of design choice and not material to the present invention. Furthermore, the number of seismic sensors 500 in each group 517, 518 may differ from group to group.

Two or more of the seismic sensors 500 in each group may be deployed with a separation that is determined based upon a noise coherence length, as discussed above. For example, the seismic sensors 500 in one of the groups of seismic sensors may be deployed with a first separation length 520 that is determined based upon a vibration noise coherence length. However, persons of ordinary skill in the art having benefit of the present disclosure should appreciate that not all of the seismic sensors 500 are necessarily separated by the first separation length 520. For example, some of the seismic sensors 500 may be separated by a second separation length 525 that is longer than the first separation length 520. Separating one portion of the seismic sensors 500 by the first separation length 520 and another portion of the seismic sensors 500 by the second separation length 525 may improve the noise reduction characteristics of the data while also permitting seismic sensors 500 to be distributed over a relatively long seismic cable 510. Furthermore, the separation lengths 520, 525 between the seismic sensors 500 in each group 517, 518 may differ from group to group.

The groups of the seismic sensors 500 may be communicatively coupled to one or more processing units 530 to permit the processing units 530 to access data collected by the seismic sensors 500 in the group. In various embodiments, the processing units 530 may process portions of the accessed data using one or more of the techniques described above before providing the partially processed data, e.g., to a bus or cable 535 that may provide the partially processed data to an external processing unit, such as a processing unit located on a survey vessel. The bus or cable 535 may or may not be deployed within the seismic cable 510 although in the interest of clarity the bus or cable 535 is depicted external to the seismic cable 510 in FIG. 5.

The processing units 530 and/or the associated groups of seismic sensors 500 may be separated by a group length 540, which may be constant along the length of the seismic cable 510 or may vary along the length of the seismic cable 510. The seismic sensors 500 in each group also define a filter aperture 545. As used herein, the term "filter aperture" refers to the center to center distance between the first and last sensors 500 in a group for spatial filtering and/or the time difference between the first and the last time sample in time domain filtering. In one embodiment, the filter aperture 545 may be longer than the group length 540, at least in part because some of the seismic sensors 500 in each group also belong to an adjacent group. Alternatively, the filter aperture 545 may be equal to or shorter than the group length 540, at least in part because each of the sensors 500 belongs exclusively to a single group. Furthermore, the filter aperture 545 may or may not vary along the length of the seismic cable 510. Persons of ordinary skill in the art having benefit of the present disclosure should also appreciate that the seismic sensors 500 that make up the groups (and define the filter apertures) may be modified. For example, the processing units 530 may access data provided by different seismic sensors 500 in the groups at different times.

In one embodiment, the processing unit 530 may provide electrical connectivity that may function to combine and/or average the electrical signals received from each independent sensor 500 within a group to form a group output signal. This technique may be referred to as analog group forming. Noise in the electrical signals received from the sensors 500 may be produced by vibration noise, which has a relatively small coherence length, whereas the seismic signal represented in the electrical signals may be produced by oscillations having a relatively large coherence length. Accordingly, by combining and/or averaging the electrical signals received from sensors 500 in a group having a selected spatial spacing between the sensors (or characteristic length between the sensors 500) that is longer than the coherence length of the vibration noise, the portion of the electrical signal representative of the seismic signal in the group output signal may be retained while the portion of the electrical signal in the group output signal representative of vibration noise may be reduced.

The processing units 530 may also define and/or modify one or more weights (e.g., of one or more digital filters) that may be applied to the data acquired by different seismic sensors 500 in the groups. For example, seismic sensors 500 closer to the center of the group may be weighted more strongly than seismic sensors 500 at the edges of the group, e.g., using a Gaussian weighting function. For another example, if one or more of the seismic sensors 500 appears to be operating unreliably or in an unexpected manner, these seismic sensors 500 may be given a smaller weighting. However, persons of ordinary skill in the art should appreciate that any weighting scheme (or no weighting scheme) may be applied to the seismic sensors 500.

Figure 6:
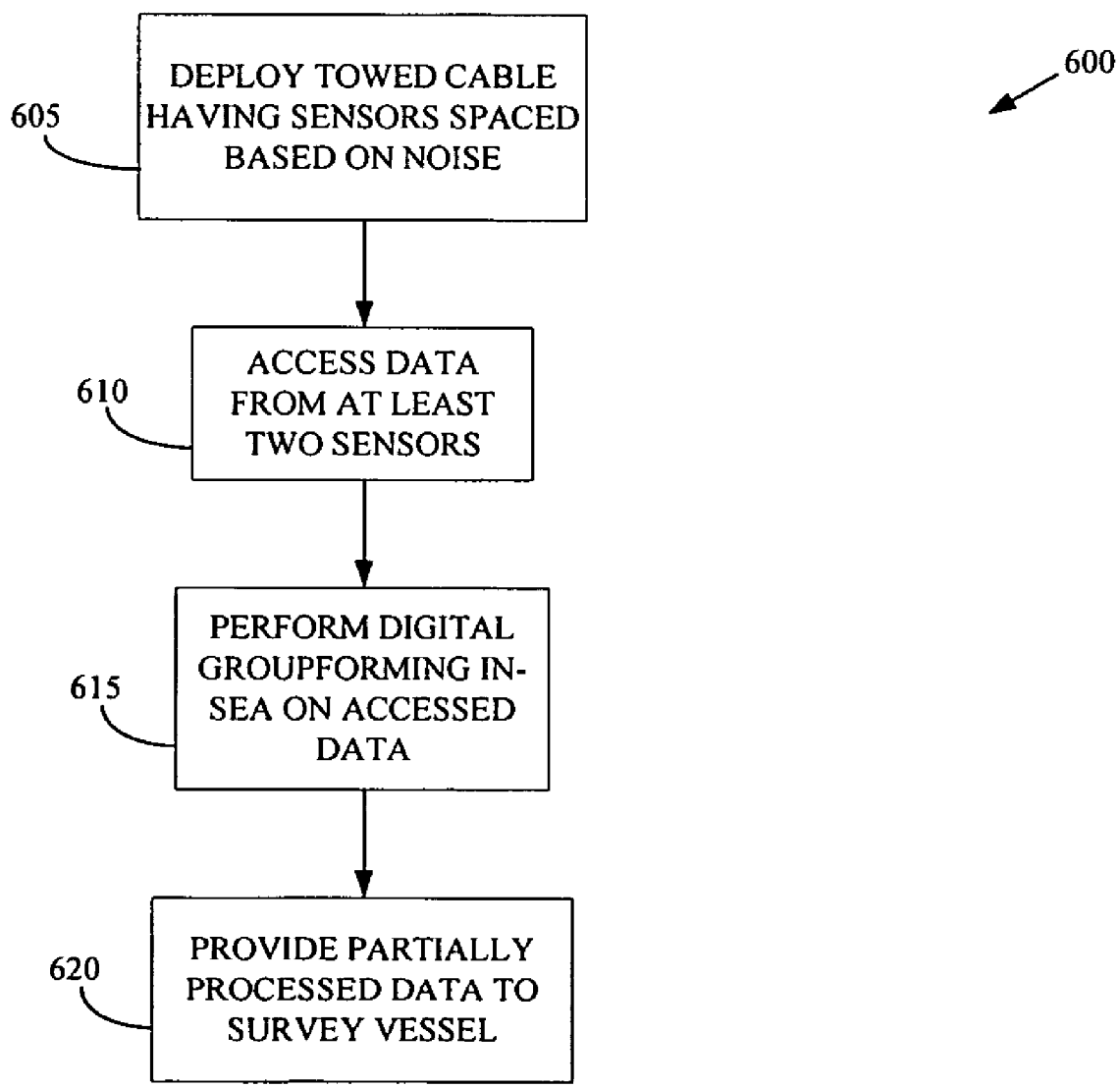
FIG. 6 conceptually illustrates one exemplary embodiment of a method 600 of acquiring seismic data, in accordance with the present invention.

FIG. 6 conceptually illustrates one exemplary embodiment of a method 600 of acquiring seismic data. In the illustrated embodiment, one or more towed marine seismic cables are deployed (at 605). The towed marine seismic cables include two or more seismic sensors spaced apart by at least one length that is determined based upon an expected noise coherence length. The seismic sensors may detect or send a signal including a seismic signal and a noise signal. Data indicative of the detected signals is accessed (at 610) from the sensors, e.g., by a processing unit. The accessed data may then be processed (at 615) in-sea. In one embodiment, the processing (at 615) includes performing (at 615) digital groupforming on the data provided by the seismic sensors by the length determined based upon the expected noise coherence length. The partially processed data may then be provided (at 620) to a survey vessel, where additional processing may be performed on the data.

Figure 7:
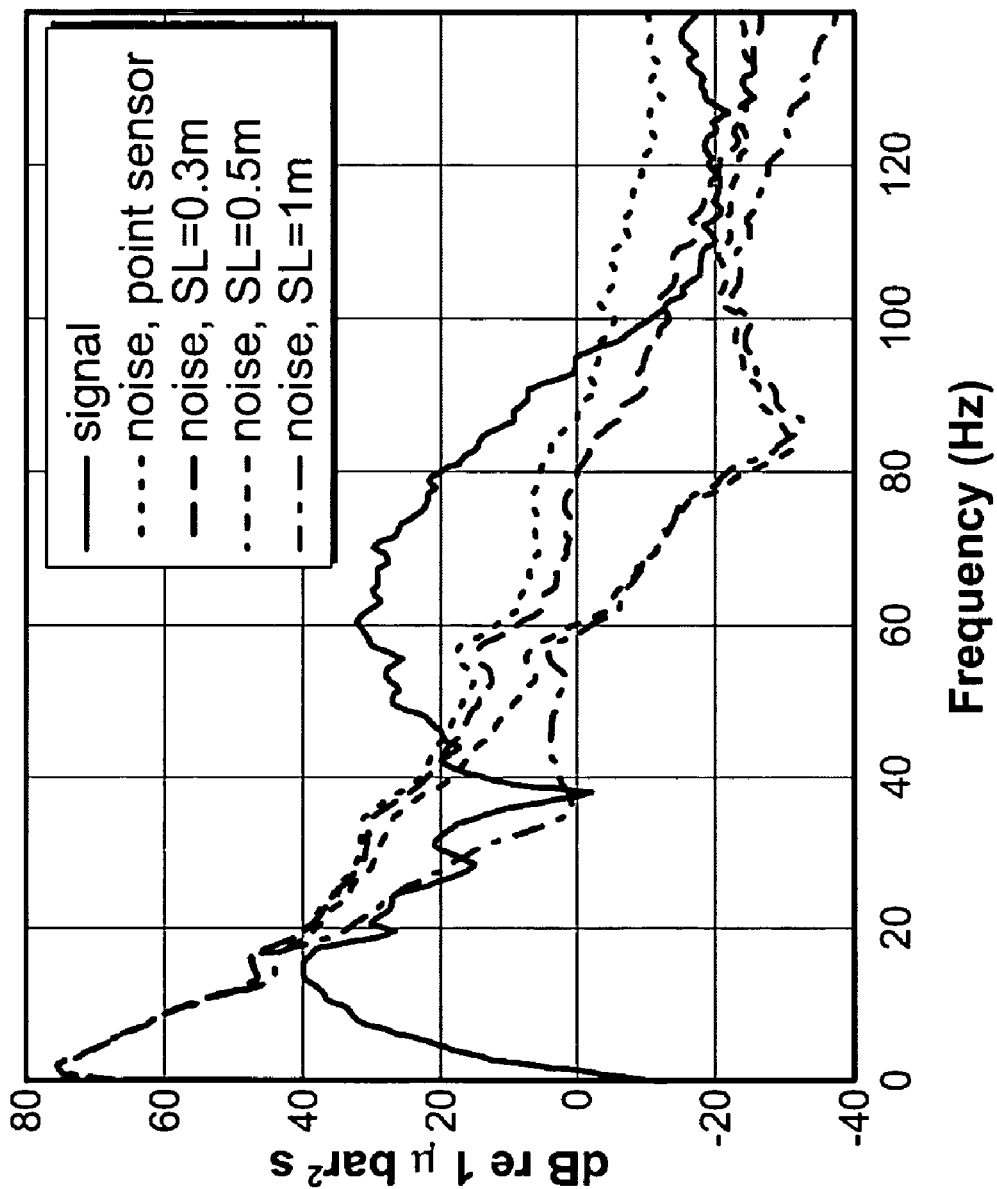
FIG. 7 illustrates the effect of sensor length on noise attenuation performance of in-sea processing.

FIG. 7 illustrates the effect of sensor length on noise attenuation performance of in-sea processing. In the illustrated embodiment, the vertical axis indicates the measure noise levels on a per sensor basis (in units of dB re 1 μBar²s) and the horizontal axis indicates frequency in Hertz. The short-dashed curve shows the noise PSD from a point measurement. The solid curve shows the signal PSD for reference. The PSD for sensors having a finite sensor length SL is calculated for in-sea processing as follows:

$$y(t, x) = \frac{1}{SL} \int_{u=0}^{SL} s(t, x - u) \, du$$

where t is the time dimension, x is the space dimension, s is the seismic signal and vibration noise, SL is the sensor length, and y is the output of the mechanical filter. From these equations it is clear that, mechanical filtering corresponds to the averaging of the wavefield over a running window of duration SL meters.

In the illustrated embodiment, the seismic signal has wavelengths longer than 5-10 m, while the vibration noise covers a broader range of wavelengths. A sensor of length L attenuates particle motions with a wavelength of L or smaller. If L is chosen smaller than the wavelengths of the seismic signal, noise attenuation can be achieved without affecting the signal. In FIG. 7, the measured noise levels (per sensor basis) as a function of the sensor length are shown with various dashed curves as indicated in the legend. The noise PSD for a sensor length of 0.3 meters is indicated by the long-dashed line. The noise PSD for a sensor length of 0.5 meters is indicated by the medium-dashed line. The noise PSD for a sensor length of 1.0 meters is indicated by the dot-dashed line. The plotted data indicates that there is frequency selective noise attenuation. In the illustrated example, there is better noise attenuation at higher frequencies and the noise attenuation power increases with the aperture of the mechanical filter (sensor length).

Figure 8:
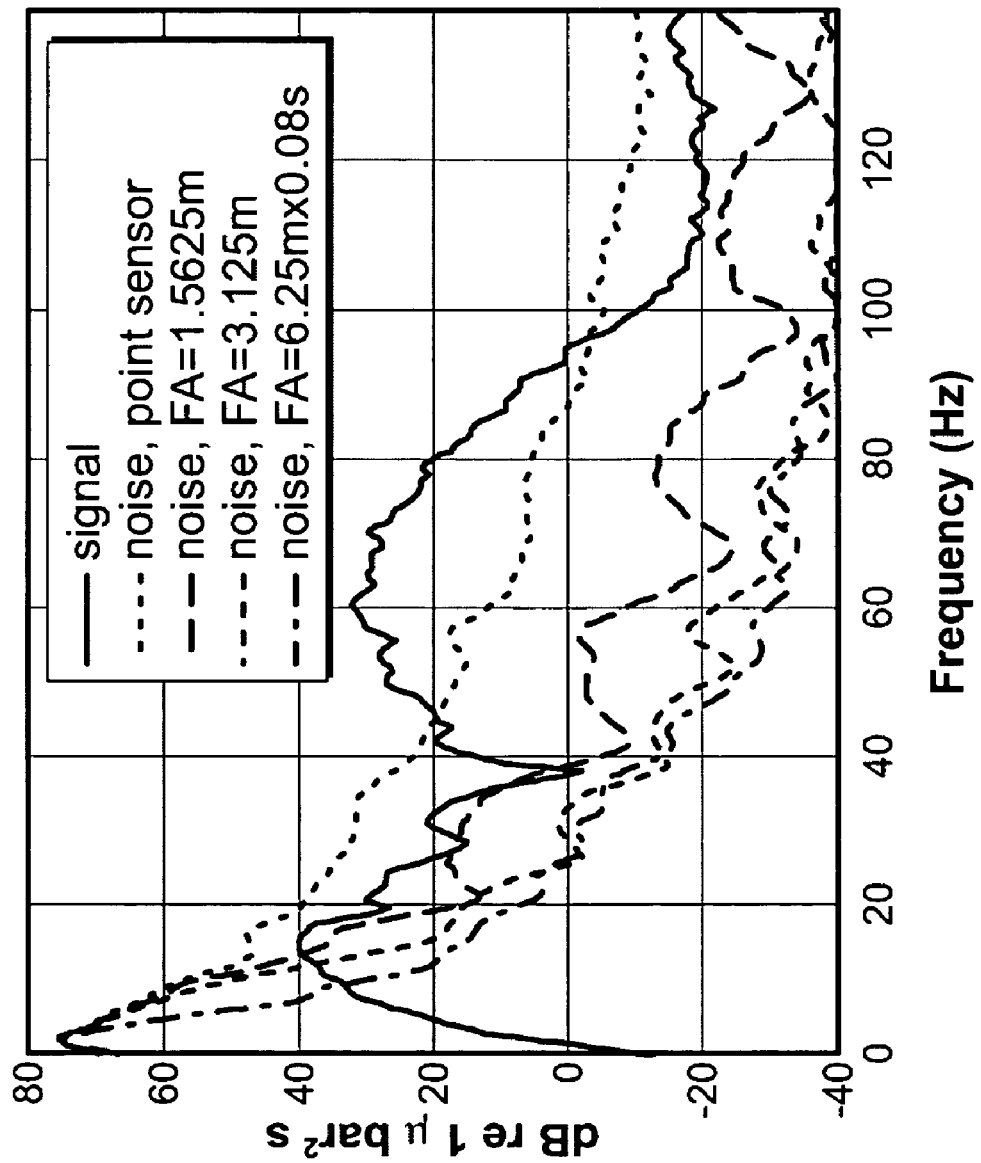
FIG. 8 illustrates noise attenuation performance as a function of the filter aperture.

FIG. 8 illustrates noise attenuation performance as a function of the filter aperture. In the illustrated embodiment, the vertical axis indicates the measure noise levels on a per sensor basis (in units of dB re 1 μBar²s) and the horizontal axis indicates frequency in Hertz. The short-dashed curve shows the noise PSD for a point measurement. The solid curve shows the signal PSD for reference. The filtered signals are determined using digital in-sea processing with a time-space filter given by the expression:

$$y(t, x) = \sum_{j=0}^{J-1} \sum_{k=0}^{K-1} c_{jk} s(t - jT, x - x_k)$$

where t is the time dimension, x is the space dimension, s is the seismic signal and vibration noise, K is the number of sensors in the group, $x_k$ are the sensor spacing between adjacent sensors (say sensor k-1 and sensor k with $x_0=0$), T is the temporal sampling interval, $c_{jk}$ are the digital filter coefficients, and y is the output of the digital filter. The filter coefficients used in these simulations were designed to have a flat response for low wave numbers and high attenuation for high wave numbers. These types of filters are also known as anti-aliasing filters.

In the illustrated embodiment, sensor spacing was chosen to be about 31 cm. The coefficients of digital filters corresponding to different filter apertures were chosen to minimize the noise energy while preserving the signal. For example, a finite impulse response (FIR) filter design technique can be used. Filter apertures for space filters were chosen as 1.5625 m and 3.125 m. The noise PSD for a filter aperture of 1.5625 meters is indicated by the long-dashed line. The noise PSD for a filter aperture of 3.125 meters is indicated by the medium-dashed line. It is also possible to do time and space domain filtering for improved performance. For instance, the dashed and dotted curve shows the noise PSD corresponding to a time-space filter with aperture of 6.25 m×0.08 s.

FIGS. 9(*a*), 9(*b*), 9(*c*), and 9(*d*) illustrate noise attenuation for a first exemplary embodiment of in-sea processing. In the illustrated embodiment, the signal is first processed in-sea using techniques such as those described above with regard to FIGS. 7 and 8 to obtain the data corresponding to the in-sea processing. The data is then decimated to a group spacing of 1.5625 m. On these data (sampling interval=2 ms in time and 1.5625 m in space), which are assumed to be transmitted on to the vessel, a standard FK filter is used to remove the remaining noise outside the signal cone.

In the illustrated embodiment, the sensor length is SL=FA=50 cm, the sensor spacing is SS=1.5625 m and the group spacing is GS=1.5625 m. FIGS. 9(*a*)-9(*c*) show the noise characteristics (e.g., the FK spectrum and PSD of the groups sent to the vessel) of individual groups transferred to the on board acquisition system. The upper solid curves on the PSD plots show the noise level of the raw data. The lower solid curves show the remaining noise after in-sea processing. In the illustrated embodiment, the vibration noise at high frequencies and wave numbers are attenuated. FIG. 9(*d*) illustrates the additional noise attenuation that can be obtained by using computationally intensive digital group forming techniques on a survey vessel. At frequencies where the noise aliases with the seismic signal, FIGS. 9(*a*)-9(*d*) demonstrate that digital group forming may not be able to reduce the noise level further down than the level achieved by in-sea processing. In particular, FIG. 9(*d*) shows high noise levels (dashed curve) at certain frequencies.

FIGS. 10(*a*), 10(*b*), 10(*c*), and 10(*d*) illustrate noise attenuation for a second exemplary embodiment of in-sea processing. In the illustrated embodiment, the signal is first processed in-sea using techniques such as those described above with regard to FIGS. 7 and 8 to obtain the data corresponding to the in-sea processing. The data is then decimated to a group spacing of 1.5625 m. On these data (sampling interval=2 ms in time and 1.5625 m in space), which are assumed to be transmitted on to the vessel, a standard FK filter is used to remove the remaining noise outside the signal cone.

In the illustrated embodiment, the sensor length is SL=8 cm, the sensor spacing is SS=30 cm, the filter aperture is FA=6.25 m, and the groups spacing is GS=1.5625 m. Note that since filter aperture is longer than the group spacing, the in-sea noise attenuation filters are overlapping in space. FIGS. 10(*a*)-10(*c*) show the noise characteristics of individual groups transferred to the on board acquisition system. The medium-dashed curves on the PSD plots show the noise level of the raw data. The solid curves show the remaining noise after in-sea processing. In the illustrated embodiment, the vibration noise at high frequencies and wave numbers are attenuated. FIG. 10(*d*) illustrates the additional noise attenuation that can be obtained by using computationally intensive digital group forming techniques on vessel. At frequencies where noise aliases with signal, digital group forming on the survey vessel may not be able to reduce the noise level further down than the level achieved by in-sea processing. For example, high noise levels (dashed curve) can be seen at certain frequencies in FIG. 10(*d*).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   accessing data acquired by at least two seismic sensors in a marine environment, the data comprising a seismic signal and a noise signal, and said at least two seismic sensors being separated by a length determined based on a vibration noise coherence length; and
   processing the accessed data to remove a portion of the noise signal.

2. The method of claim 1, wherein processing the data comprises processing a portion of the data in-sea.

3. The method of claim 2, wherein processing the portion of the data in-sea comprises processing data acquired by at least two particle motion sensors using digital groupforming or analog groupforming.

4. The method of claim 1, wherein accessing the data comprising a seismic signal and the noise signal comprises accessing data acquired by at least two particle motion sensors, the accessed data comprising a vibration noise signal.

5. The method of claim 4, wherein accessing the data acquired by said at least two particle motion sensors comprises accessing data acquired by at least two particle motion sensors that are separated by a length determined based on a vibration noise coherence length.

6. The method of claim 5, wherein accessing the data acquired by said at least two particle motion sensors comprises accessing data required by at least two particle motion sensors separated by a length that is less than about 1 meter.

7. The method of claim 5, wherein accessing the data acquired by at least two particle motion sensors separated by the length determined based on the vibration noise coherence length comprises accessing data acquired by at least two particle motion sensors separated by a length determined based on a velocity of the vibration noise.

8. The method of claim 7, wherein accessing data acquired by at least two particle motion sensors comprises accessing data acquired by at least two particle motion sensors separated by a length associated with a velocity of the vibration noise that is within the range of 20 meters per second to 75 meters per second.

9. An apparatus, comprising:
   a seismic cable for use in a marine environment;
   at least two seismic sensors on the seismic cable and being separated by a length determined based on a noise coherence length and configured to receive data comprising a seismic signal and a noise signal; and
   a processing unit communicatively coupled to said at least two seismic sensors, the processing unit being configured to:
   access data acquired by said at least two seismic sensors; and
   process the accessed data to remove a portion of the noise signal.

10. The apparatus of claim 9, further comprising at least one seismic cable, and wherein said at least two seismic sensors are coupled to said at least one seismic cable.

11. The apparatus of claim 10, further comprising at least one survey vessel configured to tow said at least one seismic cable during a seismic survey.

12. The apparatus of claim 9, wherein said at least two seismic sensors comprise at least two particle motion sensors, and wherein the processing unit is configured to access data comprising a vibration noise signal.

13. The apparatus of claim 12, wherein said at least two particle motion sensors are separated by a length determined based on a vibration noise coherence length.

14. The apparatus of claim 13, wherein said at least two particle motion sensors are separated by a length that is less than about 1 meter.

15. The apparatus of claim 12, wherein said at least two particle motion sensors are separated by a length determined based on a velocity of the vibration noise.

16. The apparatus of claim 15, wherein said at least two particle motion sensors are separated by a length associated with a velocity of the vibration noise that is within the range of 20 meters per second to 75 meters per second.

17. The apparatus of claim 12, wherein a portion of the processing unit is deployed in-sea.

18. The apparatus of claim 17, wherein the portion of the processing unit that is deployed in-sea is configured to process data acquired by said at least two particle motion sensors using digital groupforming or analog groupforming.

19. A method, comprising:
   accessing data acquired by at least two seismic sensors in a marine environment, the data comprising a seismic signal and a noise signal; and
   processing the accessed data in-sea using digital groupforming to remove a portion of the noise signal.

20. The method of claim 19, wherein processing the portion of the data in-sea comprises processing data acquired by said at least two seismic sensors using digital groupforming or analog groupforming.

21. The method of claim 19, wherein accessing the data comprising the seismic signal and the noise signal comprises accessing data acquired by at least two particle motion sensors, the accessed data comprising a vibration noise signal.

22. The method of claim 21, wherein accessing the data comprises accessing data acquired by at least two particle motion sensors separated by a length determined based on a vibration noise coherence length.

23. The method of claim 22, wherein accessing the data acquired by said at least two particle motion sensors comprises accessing data required by at least two particle motion sensors separated by a length that is less than about 1 meter.

24. The method of claim 22, wherein accessing the data acquired by at least two particle motion sensors separated by the length determined based on the vibration noise coherence length comprises accessing data acquired by at least two particle motion sensors separated by a length determined based on a velocity of the vibration noise.

25. The method of claim 24, wherein accessing data acquired by at least two particle motion sensors comprises accessing data acquired by at least two particle motion sensors separated by a length associated with a velocity of the vibration noise that is within the range of 20 meters per second to 75 meters per second.

26. An apparatus, comprising:
a seismic cable for use in a marine environment;
at least two seismic sensors on the seismic cable and configured to receive data comprising a seismic signal and a noise signal; and
a processing unit communicatively coupled to said at least two seismic sensors, the processing unit being configured to:
access data acquired by said at least two seismic sensors; and
process the accessed data in-sea to remove a portion of the noise signal.

27. The apparatus of claim 26, wherein the processing unit is configured to process data in-sea using digital groupforming or analog groupforming.

28. The apparatus of claim 26, further comprising at least one seismic cable, and wherein said at least two seismic sensors are coupled to said at least one seismic cable.

29. The apparatus of claim 28, further comprising at least one survey vessel configured to tow said at least one seismic cable during a seismic survey.

30. The apparatus of claim 26, wherein said at least two seismic sensors comprise at least two particle motion sensors, and wherein said at least two seismic sensors are configured to receive data comprising a vibration noise signal.

31. The apparatus of claim 30, wherein said at least two particle motion sensors are separated by a length determined based on a vibration noise coherence length.

32. The apparatus of claim 31, wherein said at least two particle motion sensors are separated by a length that is less than about 1 meter.

33. The apparatus of claim 30, wherein said at least two particle motion sensors are separated by a length determined based on a velocity of the vibration noise.

34. The apparatus of claim 33, wherein said at least two particle motion sensors are separated by a length associated with a velocity of the vibration noise that is within the range of 20 meters per second to 75 meters per second.

* * * * *